Oct. 25, 1927.
J. F. EGENOLF
1,646,856
BAIL FOR CONTAINERS
Filed April 18, 1925   2 Sheets-Sheet 1
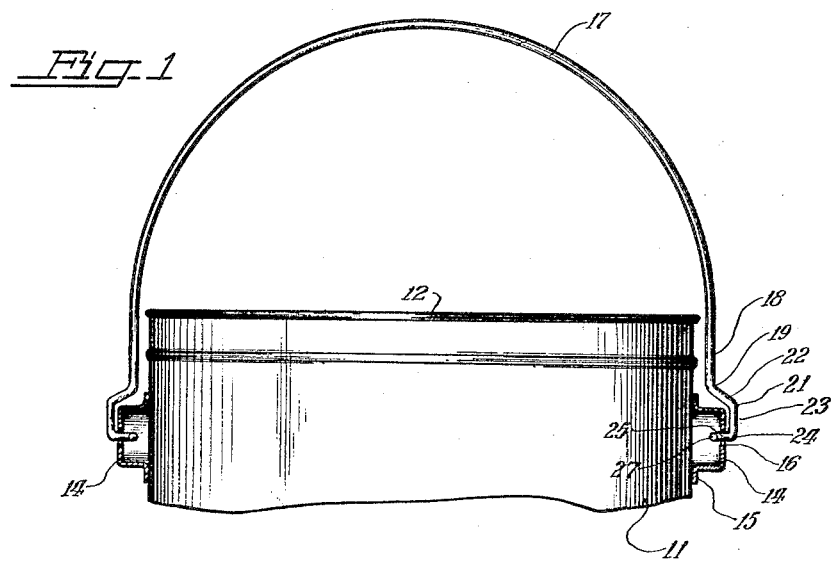
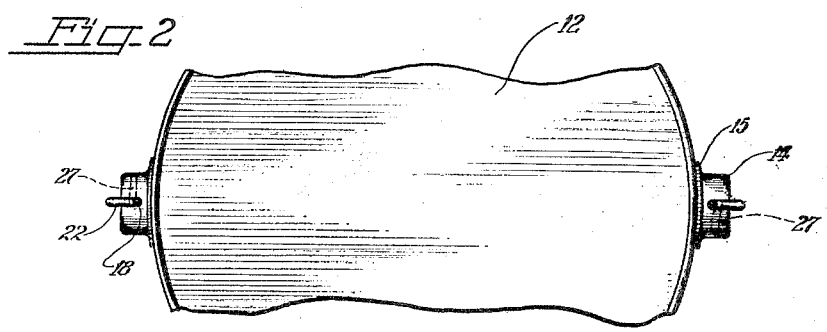
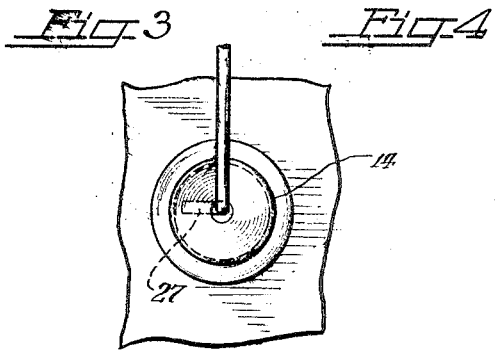
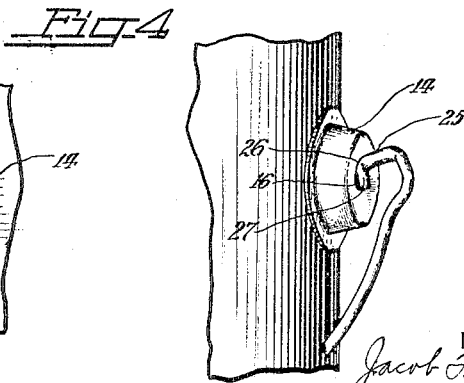
INVENTOR
Jacob F. Egenolf
BY: Munday, Clarke
& Carpenter
ATTORNEY

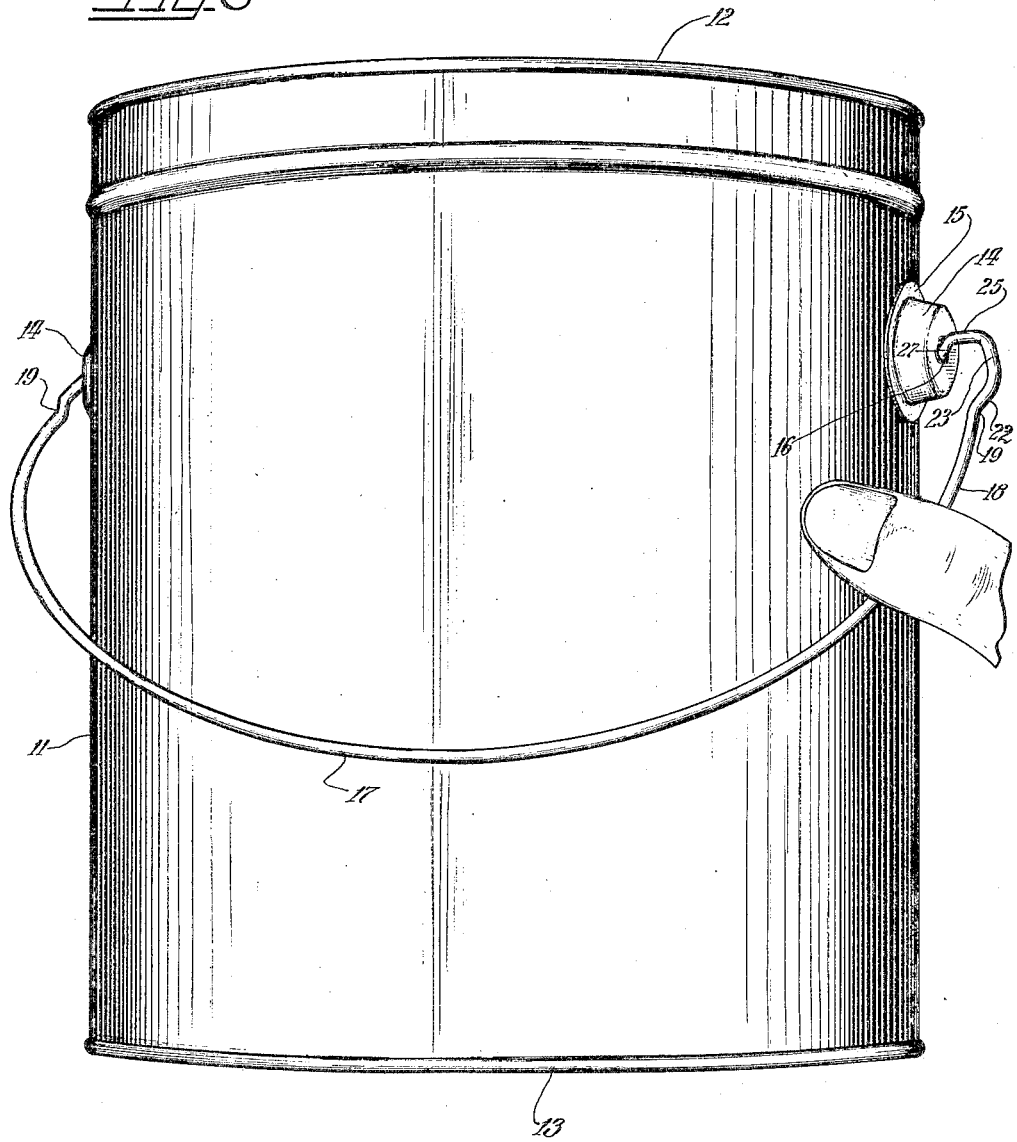

Patented Oct. 25, 1927.

1,646,856

UNITED STATES PATENT OFFICE.

JACOB F. EGENOLF, OF MAYWOOD, ILLINOIS, ASSIGNOR TO AMERICAN CAN COMPANY, OF NEW YORK, N. Y., A CORPORATION OF NEW JERSEY.

BAIL FOR CONTAINERS.

Application filed April 18, 1925. Serial No. 24,044.

My present invention relates to bails for containers, such as lard pails and the like, and has for its principal object the provision of a bail which may be completely formed prior to insertion of the ends in the bail ears and which, though formed to prevent withdrawal of said ends after they are inserted, may be quickly and easily positioned by properly manipulating the bail.

The bails most commonly used in the past have either required insertion of the ends of the bail into the bail ears prior to the attachment of the latter to the container body, or have required bending of parts of the bail to final form after insertion in the bail ears when said ears were attached prior to assembly of the bail therewith. Obviously, both of these methods are subject to practical objections, since, in the one case, expensive hand operations were necessary for soldering or clinching the ears to the container body and, in the other, not only was a difficult hand operation required for bending the bail end as an incident to positioning, but the bail at the point of bend was slightly weakened, so that at times it would bend under a heavy load when in use.

The bail elements of containers or buckets of the type contemplated should be very strong, since the container may be filled with heavy contents and thus be subjected to very great strain and, furthermore, the bail should be of such form as to prevent accidental withdrawal from the bail ears under the load. Another highly important consideration is that the parts and assembling operations should be as inexpensive as possible, in order that the containers may be manufactured at low cost and under conditions of large quantity production.

My invention renders possible the foregoing results by providing a bail which is finally formed prior to being positioned upon the bucket, thereby eliminating the difficult and weakening operation of bending as an incident to insertion of the ends in the bail ears, the bail being, nevertheless, of such form as to make accidental withdrawal practically impossible and being capable of insertion in bail ears already attached to the container by simple manipulation of the bail.

Other objects and advantages of the invention will be apparent as it is better understood from the following description, which, taken in connection with the accompanying drawings discloses a preferred embodiment thereof.

Referring to the drawings,

Figure 1 is an elevational view, partially in section, of a container having a bail embodying my invention applied thereto;

Fig. 2 is a partial top plan view, the bail being shown in section;

Fig. 3 is an elevational detail view of one of the bail ears, showing the position of the bail end therein when finally positioned;

Fig. 4 is a perspective view showing a bail ear and bail end just prior to insertion of the latter; and Fig. 5 is a perspective view of a container, showing one end of the bail inserted and illustrating the method employed for inserting the other end, which is shown in its position just prior to entrance into the bail ear.

On said drawings, illustrating the best manner in which I have thus far contemplated applying the principles of my invention, the reference character 11 indicates the body of a container having top and bottom ends 12 and 13 and having sheet metal bail ears 14 attached to the opposite sides thereof. Said bail ears have flanges 15 adapted to be soldered or otherwise permanently secured to the container body and are provided with central openings 16 adapted to receive the ends of the bail which are inserted therein, in manner which will presently be described.

The bail is preferably made of relatively heavy wire and the body 17 thereof is looped or bowed in the usual manner. The downwardly extending legs 18 of said bail at the opposite sides are bent outwardly, as indicated at 19, and then downwardly at 21, said bends providing an inclined portion 22 and vertical portion 23 conforming somewhat to the shape of the bail ear and permitting the legs 18 to be arranged close to the upper part of the container body. Beyond the vertical portion 23, the bail is bent inwardly at 24 to provide a horizontal supporting portion 25 adapted to be disposed in the opening 16 and the extremity of the bail is then turned laterally, as indicated at 26, to provide a retaining portion 27, said portion on the opposite ends of the bail extending in opposite directions, as shown clearly in Fig. 2. These retaining portions prevent accidental disarrangement of the bail ends, the weight being supported upon the inwardly extending portions 25 with respect to which said retaining portions are arranged substantially at right angles and in lateral direction. The bail may be positioned by inserting one of the ends thereof, the one at the left, as shown in Fig. 5, in the bail ear at that side, the opposite end of the bail being then positioned with the extremity 27 thereof adjacent the opening 16 of the opposite bail ear 14. This position is illustrated clearly in Fig. 4, from which it will be noted that the extreme end of the portion 27 is in contact with the circular face at the bottom of the opening 16. With the body 17 of the bail arranged against the container body, pressure may be exerted by the thumb, as indicated in Fig. 5, to force the leg 18 downwardly and outwardly, the container body acting as a fulcrum upon the body part 17 of the bail. This action arranges the part 27 in position substantially vertical to the plane of the bail ear and upon predetermined pressure being applied, it snaps into the opening 16 and assumes the position shown in Figs. 1 to 3 of the drawings, from which accidental dislodgement is virtually impossible. It should be understood that during this snapping of the part 27 in position, a torsional strain is placed within the body of the bail to permit the portion 27 to enter the opening 16 in the bail ear 14. As illustrated in the drawings and as just described, this torsion is caused by pressure of the thumb upon the bail adjacent the end 27 utilizing the body of the container as a fulcrum point. The bail however can be inserted equally well by the use of both hands, whereby the fulcrum on the body of the bail is dispensed with and the use of the fingers of the second hand is substituted therefor. In other words, one hand is used to push the end 27 into the opening, as the other hand causes the proper torsion within the body of the bail. Inserting the bail by this latter method is not dependent upon any particular position of the bail relative to the container body.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A bail for containers, comprising a curved body, having ends engageable with bail ears secured to the container, said ends having pivotal supporting parts extending inwardly toward the container and retaining parts extending laterally therefrom and adapted to prevent accidental separation of the bail from the bail ear, one of said ends being insertable into one bail ear, after the opposite end has been first positioned into the other ear, by arranging its retaining part adjacent an opening in the outer face of the bail ear and exerting inward pressure upon the bail near said end and simultaneously causing a cooperative torsional strain within the body of the bail, thereby causing said retaining part to snap into and through said opening leaving the supporting part of the end disposed in said opening.

2. A bail for containers, comprising a curved body, terminating into bail ear engaging ends, said ends being bent outwardly from the body, thence downwardly, then inwardly to provide an inwardly extending supporting part and having therebeyond laterally extending retaining portions to prevent accidental separation of the bail from the bail ear, the whole bail being finally formed prior to attachment of the bail to the container, said retaining portions being insertable into the openings of the bail ears by a torsional strain upon said bail within the limits of its resiliency, thereby causing said laterally extending retaining portions to snap into and through said bail ear openings, leaving said inwardly extending supporting parts of the ends permanently disposed in said openings.

JACOB F. EGENOLF.